No. 668,771. Patented Feb. 26, 1901.
T. H. BUTLER & O. HAMMOND.
ICE CUTTING MACHINE.
(Application filed July 7, 1900.)
(No Model.) 2 Sheets—Sheet 1.
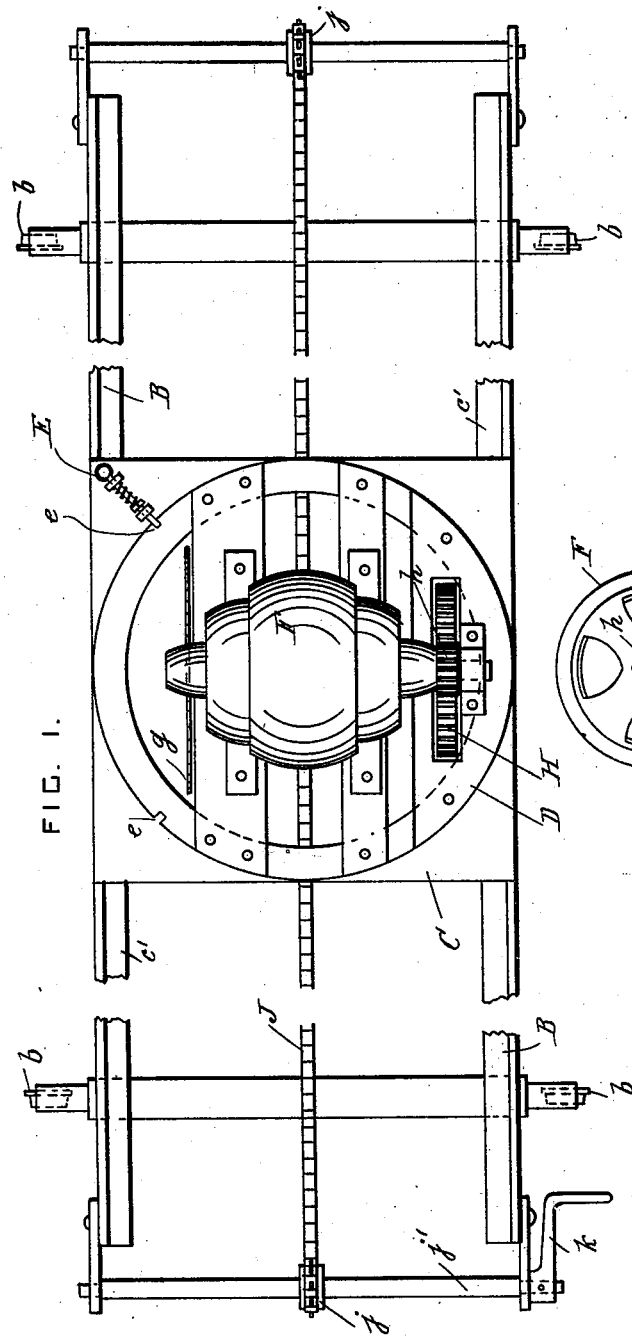
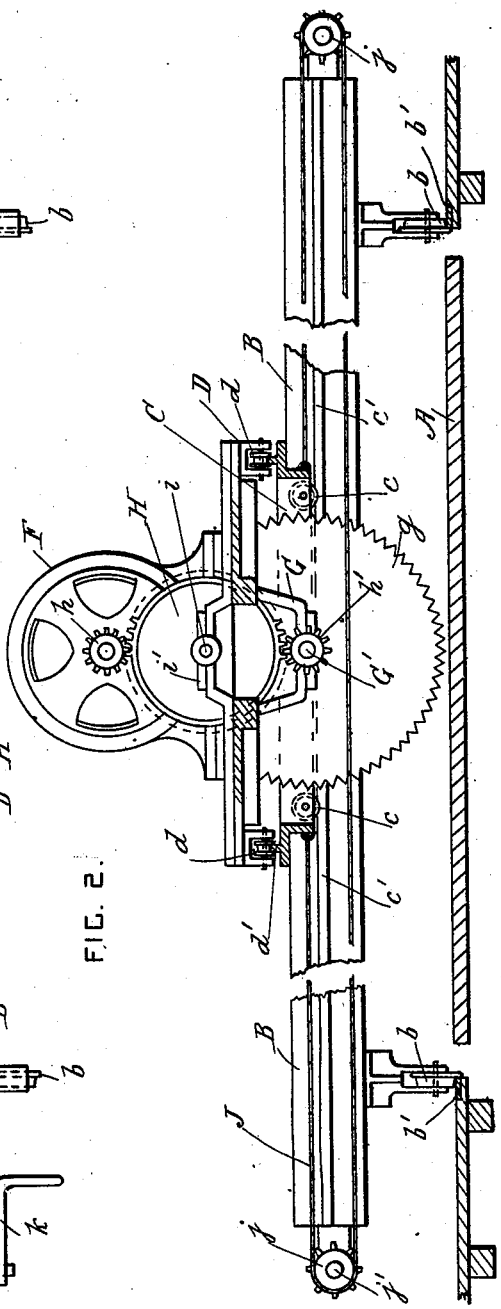
WITNESSES
INVENTORS
Thomas H. Butler & Ormond Hammond.
by Herbert W. T. Jenner.
Attorney No. 668,771. Patented Feb. 26, 1901.
T. H. BUTLER & O. HAMMOND.
ICE CUTTING MACHINE.
(Application filed July 7, 1900.)
(No Model.) 2 Sheets—Sheet 2.
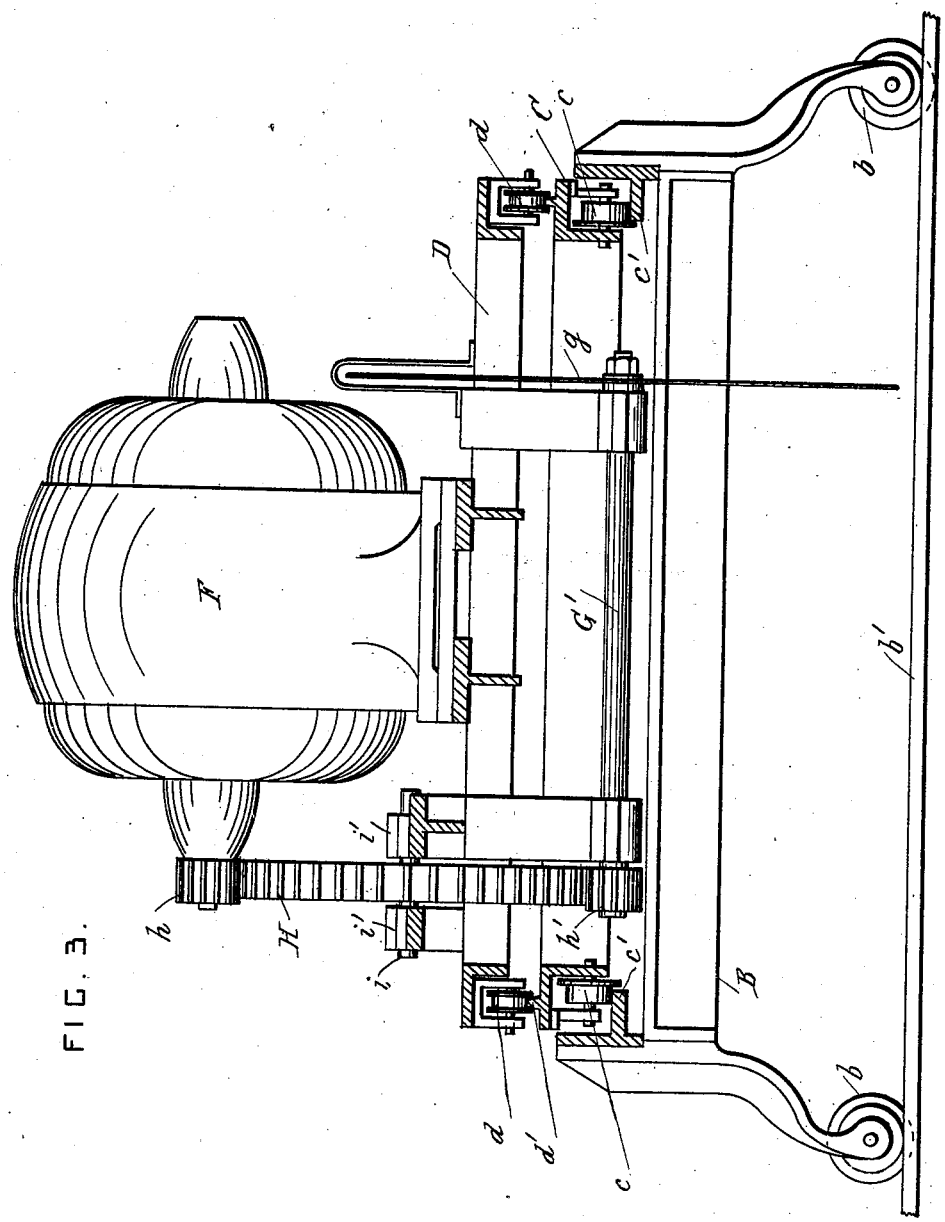
WITNESSES
INVENTORS
Thomas H. Butler & Ormond Hammond
by Herbert W. T. Jenner
Attorney

UNITED STATES PATENT OFFICE.

THOMAS H. BUTLER AND ORMOND HAMMOND, OF BALTIMORE, MARYLAND.

ICE-CUTTING MACHINE.

SPECIFICATION forming part of Letters Patent No. 668,771, dated February 26, 1901.

Application filed July 7, 1900. Serial No. 22,862. (No model.)

*To all whom it may concern:*

Be it known that we, THOMAS H. BUTLER and ORMOND HAMMOND, citizens of the United States, residing at Baltimore city, in the State of Maryland, have invented certain new and useful Improvements in Ice-Cutting Machines; and we do hereby declare the following to be a full, clear, and exact description of the invention, such as will enable others skilled in the art to which it appertains to make and use the same.

This invention relates to machines for cutting ice; and it consists in the novel construction and combination of the parts hereinafter fully described and claimed.

In the drawings, Figure 1 is a plan view of the machine. Fig. 2 is a longitudinal section through the same. Fig. 3 is a cross-section through the same.

A is a table or platform, upon which is placed a large cake or slab of ice which is to be cut up into blocks of convenient size for shipment and sale.

B is a carriage mounted on wheels $b$, which run on rails or guides $b'$, arranged one on each side of the table A and supported in any approved manner independent of the said table.

C is a frame provided with wheels $c$, which run on rails or guides $c'$, carried by the carriage B and arranged crosswise of the rails $b'$.

D is a turn-table mounted on wheels $d$, which run on a circular rail or guide $d'$ on the top of the frame C.

E is a retractable catch, which engages with notches $e$ in the turn-table and locks it to the frame C in any desired position.

F is a motor secured on the turn-table. Any sort of motor may be used, but an electric motor is preferred.

G represents brackets secured to the under side of the turn-table. G' is a shaft journaled in the said brackets, and $g$ is a circular cutter or saw secured on the said shaft. The teeth of the said saw are alike on each side, so that the saw will cut when run backward or forward.

A toothed pinion $h$ is secured on the motor-shaft and a toothed pinion $h'$ is secured on the saw-shaft. H is a toothed idle wheel, which gears with the teeth of the two said pinions. The idle wheel is mounted on a shaft $i$, journaled in bearings $i'$, supported by the turn-table.

The carriage is pushed back and forth upon its rails by hand. The frame C is traversed upon the carriage by means of a drive-chain J, which passes over wheels $j$ at the ends of the carriage. The wheels $j$ are mounted on shafts or supported in any approved manner. One of the said wheels is a sprocket-wheel and engages with the drive-chain, and its shaft $j'$ is provided with a crank-handle $k$, whereby the said shaft and wheel may be revolved. The ends of the drive-chain J are secured to the frame C. The saw is revolved in one direction and is run through the ice by means of the drive-chain. The carriage is then moved for a suitable distance upon its rails, and the saw is run through the ice in the reverse direction while still revolving in the same direction. When the saw arrives at the end of the cake of ice and the ice has been cut into a series of parallel strips, the turn-table is revolved on its axis for a quarter of a revolution and the saw is run through the ice by moving the carriage. The saw is run several times crosswise through the parallel strips of ice, being moved by the drive-chain and frame between each cut until the whole of the cake or slab of ice has been cut up into blocks of a convenient size for shipment and sale.

What we claim is—

1. In an ice-cutting machine, the combination, with a longitudinally-movable carriage, of a frame movable transversely on the carriage, a turn-table mounted on the frame, and a motor provided with a circular cutter and supported by the said turn-table, substantially as set forth.

2. In an ice-cutting machine, the combination, with a slidable frame, and a turn-table mounted on the said frame; of a revoluble cutter supported from the said turn-table and projecting downwardly through the said frame, a motor supported by the turn-table, and intermediate driving devices operatively connecting the said cutter with the motor, substantially as set forth.

3. In an ice-cutting machine, the combination, with a frame, of a turn-table mounted on the frame, brackets depending from the turn-table within the frame, a motor provided with a driving-shaft and mounted on the turn-table, a shaft provided with a circular cutter and journaled in the said brackets, and toothed driving-wheels connecting the said driving-shaft with the cutter-shaft, substantially as set forth.

4. In an ice-cutting machine, the combination, with a longitudinally-movable carriage, of a frame movable transversely on the carriage, a drive-chain attached to the said frame, wheels supporting the drive-chain at the ends of the carriage and provided with means for revolving one of them, a turn-table carried by the said frame, and a motor provided with a circular cutter and supported by the said turn-table, substantially as set forth.

5. In an ice-cutting machine, the combination, with a table for supporting the ice, and rails supported independent of the table and at the sides thereof; of a carriage provided with wheels which run on the said rails, a frame movable transversely upon the carriage, a turn-table mounted on the frame, and a motor provided with a circular cutter and supported by the said turn-table, substantially as set forth.

In testimony whereof we affix our signatures in presence of two witnesses.

THOMAS H. BUTLER.
ORMOND HAMMOND.

Witnesses:
ROBT. L. RHODES,
HARRY A. BARNES.